J. HETTINGER.
AERIAL CONDUCTOR FOR WIRELESS SIGNALING AND OTHER PURPOSES.
APPLICATION FILED JUNE 4, 1917.

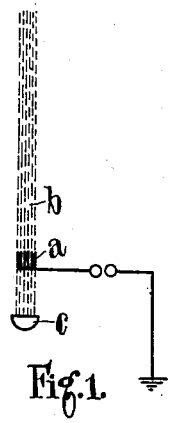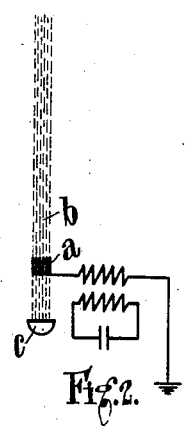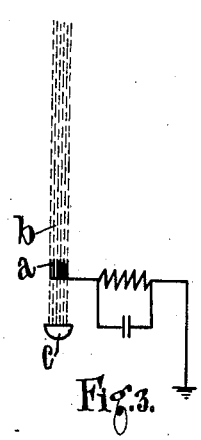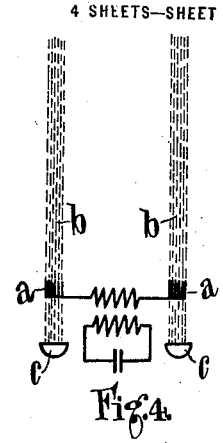
Fig.1. Fig.2. Fig.3. Fig.4.
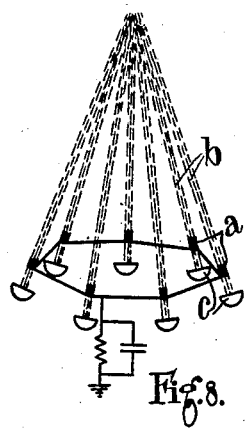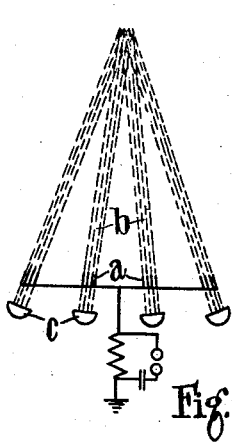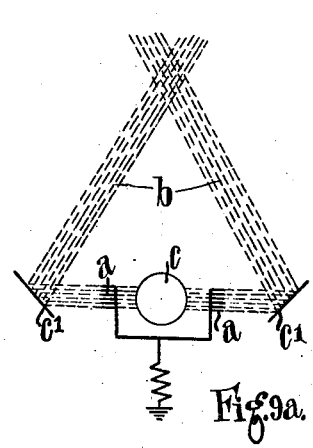
Fig.8. Fig.9. Fig.9a.

Fig.10. Fig.13. Fig.13a.
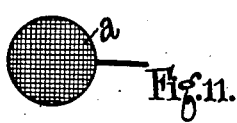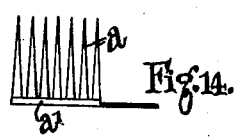
Fig.11. Fig.14. Fig.14a.
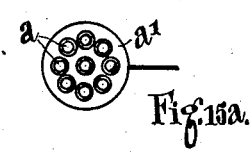
Fig.12. Fig.15. Fig.15a.

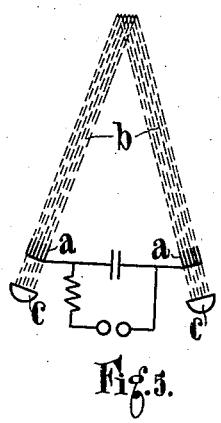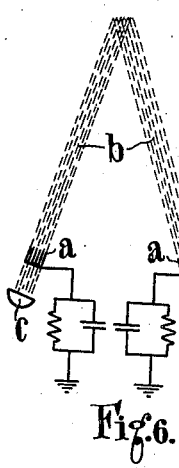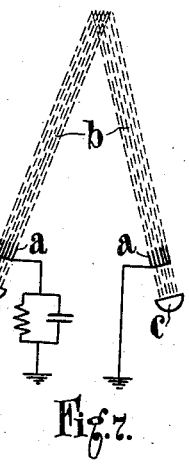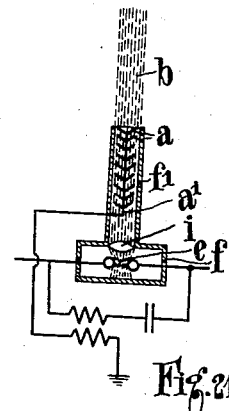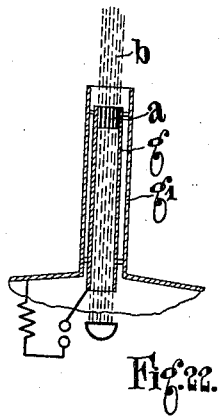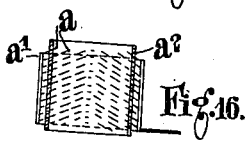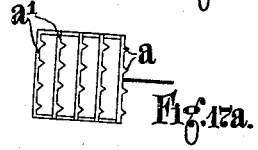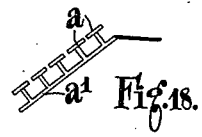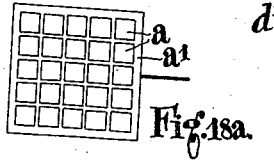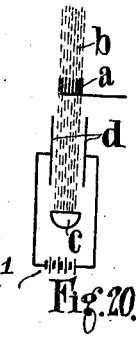

1,309,031.

Patented July 8, 1919.
4 SHEETS—SHEET 3.

John Hettinger, INVENTOR
BY
ATTORNEY

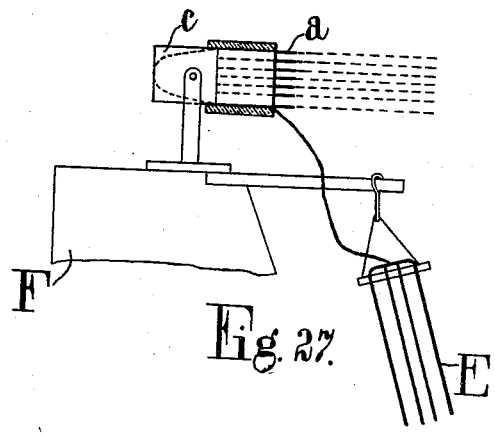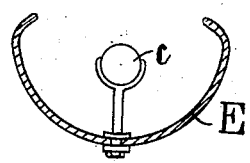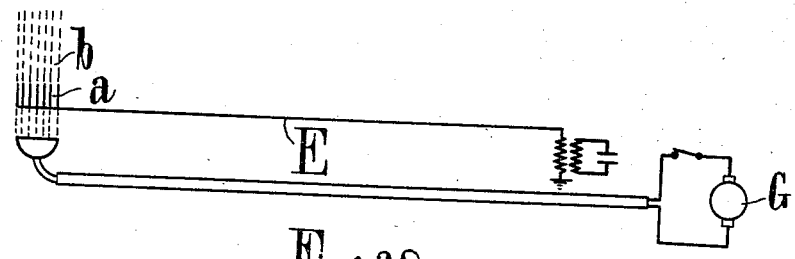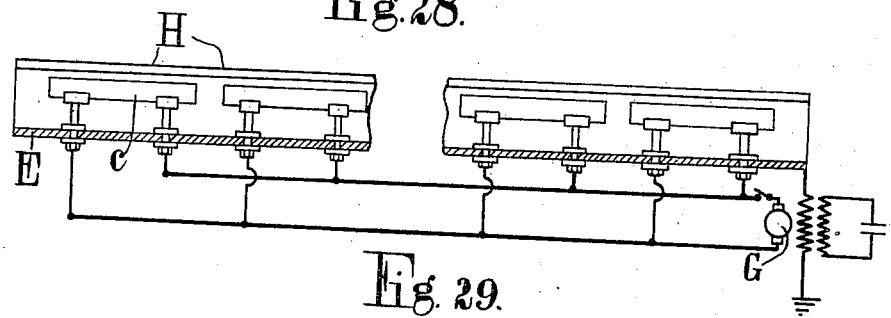

UNITED STATES PATENT OFFICE.

JOHN HETTINGER, OF STREATHAM, LONDON, ENGLAND.

AERIAL CONDUCTOR FOR WIRELESS SIGNALING AND OTHER PURPOSES.

1,309,031.  Specification of Letters Patent.  Patented July 8, 1919.

Application filed June 4, 1917. Serial No. 172,792.

*To all whom it may concern:*

Be it known that I, JOHN HETTINGER, a subject of the King of Great Britain and Ireland, residing at 34 Ribblesdale road, Streatham, London, S. W., 16, England, have invented certain new and useful Improvements in and Relating to Aerial Conductors for Wireless Signaling and other Purposes, of which the following is a specification.

This invention relates to an improved method of propagating electric energy at a distance without connecting wires and of collecting such energy, the invention being more particularly intended for use in wireless telegraphy and telephony but generally useful also for other purposes, such as the production of electric disturbances at a distance, for instance in or from airships or flying machines, the explosion of bombs or mines, etc.

The main object of the invention is to provide a substitute for transmitting and receiving aerials which does not require any high or elevated supporting means, other objects of the invention being hereinafter more particularly referred to in connection with the various applications of the fundamental idea.

The invention broadly consists in the utilization of a long beam of ionized or ionizing medium—such as a searchlight beam of ultra-violet rays produced by means of a suitable electric arc or mercury vapor lamp—as a substitute for a long conductor of electricity, which may be led thereto in the form of continuous currents or of impulses or alternating currents of low or high frequency and of low or high potential, according to the particular application and purpose of the electric circuit in which said long beam is included.

The invention also consists in the utilization of the long beam of ionized or ionizing medium as a transmitting or receiving aerial for wireless telegraphy and telephony, hereinafter referred to as the "ionized beam aerial".

The invention also consists in the arrangements of ionized beam aerials and long ionized conductors as hereinafter more particularly referred to by way of example.

I wish it to be understood that the present invention does not include the method of wireless signaling in which a beam of light or ultra-violet rays is utilized for changing the electrical conductivity of a selenium cell, nor the method in which the beam of light produced by a spark discharge or by another source of ultra-violet rays is utilized to cause a discharge through another distant spark gap, the method according to the present invention differing from these well known methods, mainly in that according to the present invention electricity is actually conveyed to and propagated through the beam employed, the beam actually forming part of an electric circuit.

In order that the essence of the invention may be better understood, it may be advisable to explain some of the phenomena on which the invention is based a little more specifically.

According to the invention, a portion of the atmosphere is continuously ionized along a beam so as to render it more conductive than the remaining portion thereof, and a good electrical connection is established between the said beam and the metallic portion of the electric circuit in which the beam is substituted for another long conductor. In view of the fact that the air along the beam is not inclosed but is in actual contact with the remaining part of the atmosphere, there is a certain amount of diffusion with the consequence that the surrounding atmosphere in the immediate neighborhood of the beam is also rendered conductive to a less extent, the conductivity decreasing continuously and quickly along circles concentric with the beam, also gradually decreasing from its electrical connection in the direction of the beam facing away from its source; further, owing to the fact that the air is free to move about, ionized particles of air will, in the case of wings, be shifted from the position they occupy in the path of the beam so that the actual form of the conductive zone will be altered to a certain extent at various points thereof. The effect of these various causes is that although ionization is continuously maintained along a predetermined line, viz., along the beam, the substitute conductor is not to be supposed to have the actual form of the beam, but a form depending upon the circumstances above referred to, the line of comparatively strongest conductivity being in the center of the beam, with small deviations therefrom in the case of moderate movements of air. The substitute conductor according to the invention, when used as an aerial for signaling purposes may therefore be compared to an elevated conductor of large surface in electrical connection with a metallic circuit, the other end of which is earthed. The potential imparted to the electrical connection with the beam, tries to equalize itself along the beam conductor as above defined, and the whole system thus absorbs a large amount of energy as compared with the energy that could be imparted thereto without the ionized beam. In the latter case, all the lines of electric force would be bent toward the earth practically immediately after leaving the outer end of the metallic circuit. In the arrangement according to the present invention, however, a current will flow along the lines of least resistance, viz., upward within the beam and immediately around the same, more particularly along the center of the beam, and there will be lines of force which will start bending downward toward the earth at a much higher point than in the case without an ionized beam. While the amount of current actually flowing through the beam may be small and decrease continuously toward the upper end of the beam, it is to be remembered that this is not material in the case of an aerial, it being known that the current flowing through the aerial, and more particularly through the upper part thereof, may be small as long as the potential is high in the upper part thereof, and the current large at its earthing point. The electrical connection of the ionized beam with a point of high potential and the absorption of great energy by such a beam insures the fulfilment of these conditions.

In the accompanying drawings which illustrate diagrammatically and by way of example various arrangements and details for carrying the invention into effect:—

Figures 1, 2, 3, 4, 5, 6, 7, 8, 9 and 9ª illustrate various arrangements of aerials.

Figs. 10, 11, 12, 13, 13ª, 14, 14ª, 15, 15ª, 16, 16ª, 17, 17ª, 18, 18ª and 19 illustrate various forms of electrical beam connections.

Fig. 20 shows a detail.

Fig. 21 illustrates a modification wherein the source of oscillations is also used as the source of the beam.

Fig. 22 shows the form of application of the invention to submarines, and

Figure 24:
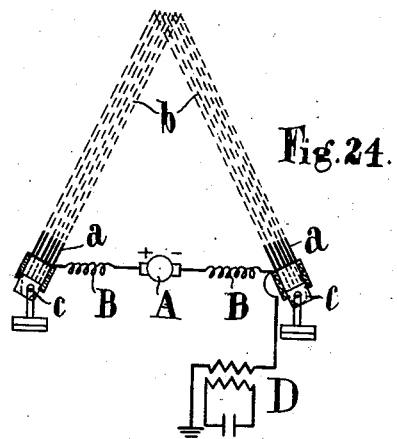
Figure 24A:
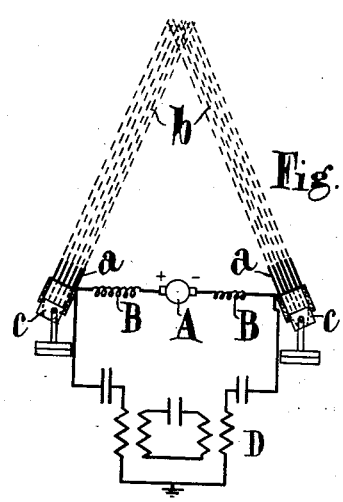

Figs. 24, 24ª, 25, 25ª, 26, 27, 28, 29 and 29ª illustrate different modifications for carrying the invention into effect.

According to one arrangement, the one end of a spark gap, (see Fig. 1), of the secondary of an oscillation transformer, (see Fig. 2), or of a self-induction coil or condenser (see Fig. 3), forming part of an oscillatory circuit is connected at $a$ with the ionized beam aerial $b$, which may be produced at $c$ as hereinbefore referred to, the other end thereof being connected to earth or its equivalent, or with another ionized beam aerial which is parallel to the first ionized beam aerial, (see Fig. 4), intersects the latter at any desired height from the earth, (see Fig. 5), or has any other suitable position relatively thereto, the sources of the beams being arranged at any desired distance apart from each other.

According to a modification, (see Fig. 6), two intersecting ionized beam aerials are associated with two separate oscillatory circuits respectively, while according to another modification, (see Fig. 7), the second intersecting ionized beam aerial is earthed but is not connected to an oscillatory circuit except through the first ionized beam aerial, which may also be earthed.

By combining together a plurality of ionized beams any well known construction of aerial may easily be built up, such as aerials of the umbrella, (see Fig. 8), of the multiple parallel, (see Fig. 9), of the triangular directive (see Figs. 5 to 7), or of any other type in which a number of wires have hitherto been connected together in an open or closed circuit aerial. The plurality of ionized beam aerials may be produced from one single source by using reflectors. Such an arrangement is illustrated in Fig. 9ª in which the source $c$ of the beam is arranged to throw the beams $b$ on reflectors $c^1$ which reflect the same in such directions as to intersect with one another where required.

The connection between the metallic portions of the electric circuits and the ionized beam aerials is preferably effected by means which are known to facilitate the discharge of electricity, such as rods with pointed ends, etc. The connecting rods or plates may be arranged within the ionized beam parallel or at any suitable angle thereto and may be replaced by or be used in conjunction with a metal cylinder or truncated cone in touch with and surrounding the beam. The connection with the ionized beam may also be effected by means of wire gauze or by a perforated metal plate or superposed plates arranged across the beam, or by metal reflectors suitably inclined relatively to the source of the beam or in any other suitable manner.

Figs. 10 to 18ª illustrate various beam connections which are subdivided for the purpose of obtaining the best results.

The connection illustrated in Fig. 10 consists of a grid $a$ comprising a series of parallel wires, the connection shown in Fig. 11 of a piece of wire gauze $a$, while the connection shown in Fig. 12 comprises a series of grids or pieces of wire gauze $a$ as shown in Figs. 10 and 11 superposed upon one another and electrically connected together.

The connection illustrated in Figs. 13 and

13ᵃ consists of a series of concentric cylinders $a$ electrically connected together, the connection shown in Figs. 14 and 14ᵃ of a series of pointed rods $a$ supported on bars $a^1$ electrically connected together, and the connection illustrated in Figs. 15 and 15ᵃ of a perforated plate $a^1$ provided with tubular extensions $a$.

According to another modification illustrated in Figs. 16 and 16ᵃ, the connection may consist of several series of pointed metal pieces $a$ supported on rods $a^1$ and penetrating into the interior of a cylinder of insulating material $a^2$, the pointed ends being preferably inclined in the forward direction of the beam passing through the cylinder.

According to a further modification illustrated in Figs. 17 and 17ᵃ, the connection may consist of a series of metallic plates $a^1$ provided with serrations $a$, the pointed ends of which are preferably directed in the forward direction of the beam, which is split up by the plates $a^1$.

Figs. 18 and 18ᵃ illustrate a reflecting connection consisting of a metallic plate $a^1$ carrying a plurality of small metallic surfaces $a$ by which the beam is reflected in the required direction.

A further form of electrical connection is illustrated in Fig. 19; the same consists of a bank of metal tubes $a$ of small diameter, the diameter preferably increasing toward the ends of the tubes facing away from the source of the beam.

It is known that when certain metals are charged, more particularly with negative electricity, they have the property of becoming discharged under the action of light, and it has been ascertained that this discharge is due to ultra-violet and other rays, and to be dependent upon the state of the surface of the metal. This property of certain metals is generally referred to as a photo-electric effect. As a small length of the beam $b$ lies between the electrical connection $a$ and the source $c$ of the beam, use may be made of the photo-electric property possessed by certain metals, and not by other metals, or substances, to prevent a discharge of electricity from the electrical connection $a$ toward the source $c$ of the beam, or to reduce it as much as possible and at the same time assist the discharge from the electrical connection $a$ in a direction away from the source of the beam. With this object in view, the photo-electric effect above referred to, has to be assisted in every respect on the surface of the connection facing away from the source of the beam, while the same has to be prevented from taking place, or reduced as much as possible on the surface facing the source of the beam; for instance, the surface of the gauzes or perforated plates facing away from the source may be highly polished, while the opposite surface may be covered with a material which is not transparent with respect to ultra-violet rays. The same object may also be attained by making the connection by means of a metal which is little sensitive with regard to the photo-electric phenomenon, such as copper, provided on the surface facing away from the source of the beam with a covering of metal which is very sensitive with respect to that phenomenon, such as rubidium or an alloy of potassium or sodium.

The discharge of electricity from the electrical connection $a$ toward the source of the beam may also be prevented, or greatly diminished, by removing or greatly reducing the conductivity of the beam between its source and the electrical beam connection by causing a direct alternating or oscillating current to flow across the beam in the part thereof lying between the source of the beam and the electrical connection. This flow of current may be produced by means of an electric field, for instance, as shown in Fig. 20 (see also Fig. 25ᵃ), the two plates $d$ of a condenser being connected to the two poles of a source $d^1$ of constant potential which may be replaced by an alternating current supply circuit of low or high frequency, which may belong to the transmitting system.

For the production of the beam, use may be made of any ordinary search-light, in which an arc lamp or mercury vapor lamp is employed, care being however taken to prevent the absorption of the ultra-violet rays by substituting quartz for all transparent parts usually employed in search-lights.

The spark or arc producing the oscillations may also be employed for producing the beam. In Fig. 21 illustrating such an arrangement by way of example, a spark gap $e$ is inclosed in a cylinder of insulating material $f$ having an extension $f^1$ which is open at its outer end to allow the passage of the beam to the exterior and the electrical connection is effected by a series of pointed metal pieces $a$ carried on a support $a^1$ electrically connected with the secondary of an oscillation transformer which is earthed. A quartz lens $i$ may also be arranged in the path of the beam.

The high frequency currents or impulses supplied to the transmitting ionized beam aerial or collected by the receiving ionized beam aerial may be superposed upon an alternating electric field of low frequency or upon a continuous electric field of high potential.

Figure 25:
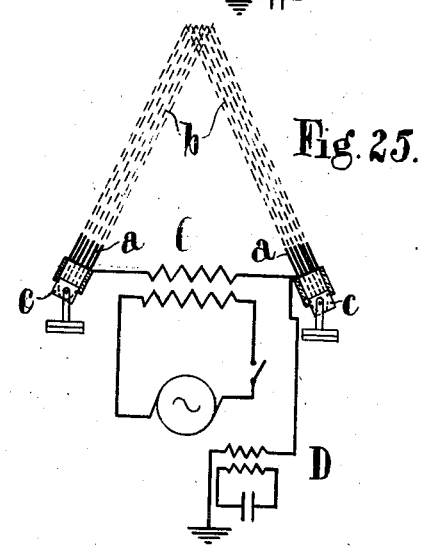
Figure 25A:
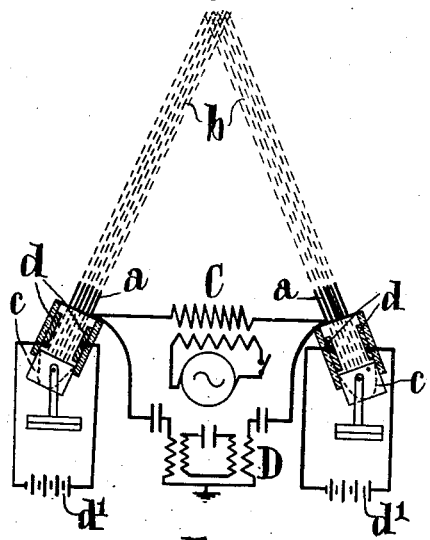

This modification is illustrated, by way of example, in Figs. 24 and 24ᵃ in connection with a continuous electric field, and in Figs. 25 and 25ᵃ in connection with an alternating electric field.

Referring to Figs. 24 and 25, the continuous or alternating field of low frequency is set up by connecting the two poles of a high voltage continuous current machine A through the inductive resistances BB, or the two terminals of the secondary C of an ordinary transformer (not a high frequency oscillation transformer) to two electrical beam connections aa, respectively, one of which is directly connected to the oscillatory system D, as hereinbefore referred to in connection with Fig. 2, while the other beam connection is not directly connected to the oscillatory system, and is placed in an ionized beam arranged to intersect the beam in which the beam connection first referred to is placed. Referring to Figs. 24ª and 25ª, the same differ from Figs. 24 and 25, respectively, in that both beam connections are directly connected to the oscillatory system.

Figure 26:
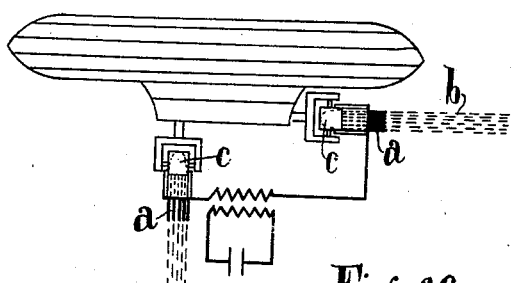

In the application of the invention to wireless signaling to and from aircraft, use is preferably made on the aircraft of one ionized beam aerial directed downward so that it may strike the earth, a telegraph wire, the rail of a train, or other conductor, and of another ionized beam aerial which is substantially parallel to the earth, thereby forming a directive aerial. (See Fig. 26).

The aerial according to the present invention, may be used in conjunction with any wireless aerial of known construction—for instance it may be movably connected with the top end of the usual elevated aerial thereby forming a directive aerial of the horizontal type. Fig. 27 illustrates such an arrangement in which the source c of the beam, together with the electrical beam connection a, which is mounted in an insulated manner on the casing of the source c and is electrically connected with the top of the aerial E, is mounted on a high support in a well known manner so that it may be turned in a horizontal plane as well as in a vertical plane.

Attempts have hitherto been made to transmit wireless signals over long distances by means of horizontal aerials of short height, but such attempts have not hitherto led to any practical results; such results may however be obtained by combining this kind of aerials with the ionized beam aerials according to the present invention, for instance, as shown in Fig. 28, by leading the free end of the horizontal metallic aerial E into the ionized beam by means of a beam connection a, the source of the beam receiving its energy from a source of current G; or by arranging said metallic aerial in a plane of ultra-violet or equivalent rays directed upward. The latter arrangement is preferably carried out as shown in Figs. 29 and 29ª, by using as the metallic horizontal aerial, a long strip E of zinc or other metal which is sensitive with regard to the photo-electric phenomenon, and is bent transversely to form a trough, the ionized aerial b being produced by a plurality of mercury vapor lamps c of tubular shape suitably supported in the concave part of the metallic trough and being directed upward in a plane containing the metallic aerial. The mercury vapor lamps receive the current from the source of energy G.

The invention is also well adapted for use on submarines, and Fig. 22 illustrates by way of example a transmitting arrangement used in connection therewith. The electrical connection a is attached to the upper part of a metal tube g which is arranged within a periscope or like tube $g^1$ and forms with the latter a condenser included in an oscillatory circuit. The system is earthed through the body of the submarine. The periscope mirror (not shown) which may be used to reflect the beam in any desired direction must be made of metal or the glass used in ordinary mirrors must be replaced by quartz. The receiving apparatus may be connected up to the beam aerial in a similar manner.

A long ionized beam at a transmitting station connected to a source of continuous or ordinary alternating currents and ordinary transmitting apparatus may be used in combination with a similar beam at a receiving station connected to a receiver, for the purpose of telegraphic or telephonic communication, the circuit being completed through earth and through the upper ionized layers of the atmosphere, and the electrical beam connections being effected as hereinbefore referred to.

Figure 23:
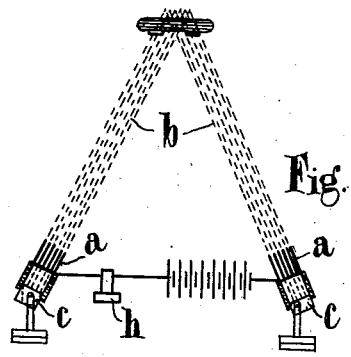
Fig. 23 illustrates one form of application of the invention to the detection of aircraft in space.

A further application of the ionized beam aerials consists in their utilization for detecting the passage of aircraft through the space. For this purpose a suitable sensitive current indicator or detector, for instance a telephone h, is inserted in a connection between the bases of two beam aerials, the latter intersecting each other at a variable point by changing the directions of the beams in a well known manner, and the beams forming, together with the metallic part of the arrangement, an electric circuit, the current through which is changed by the passage of the aircraft. (See Fig. 23).

I wish it to be understood that the various arrangements and details hereinbefore referred to for carrying the invention into effect may be varied without in any way departing from the spirit and scope of the invention, and that the invention is not limited to the applications hereinbefore specifically mentioned. I also wish it to be understood that although I have assumed that the conductivity of the beam is due to an effect of ionization, in accordance with the present day theory, the invention is independent of any such theory and includes all means by which a long beam of a gaseous medium can be made conductive.

What I claim is:—

1. Substitute means for long conductors of electricity forming part of an electric circuit comprising means for ionizing the atmosphere along a long beam, and means for electrically connecting said ionized beam to the electric circuit, as set forth.

2. In combination an electric circuit through which electric energy is supplied, means for ionizing the atmosphere along a long beam and means for electrically connecting said ionized beam to the said electric circuit, as set forth.

3. Substitute means for long conductors of electricity forming part of an electric circuit comprising a source of ultra-violet rays arranged to ionize the atmosphere along a long beam and means for electrically connecting said ionized beam to the electric circuit, as set forth.

4. In combination an electric circuit through which electric energy is supplied, a source of ultra-violet rays arranged to ionize the atmosphere along a long beam, and means for electrically connecting said ionized beam to the said electric circuit, as set forth.

5. Aerials for wireless signaling comprising means for ionizing the atmosphere along a long beam and electrically connecting means inserted in said ionized beam, as set forth.

6. Aerials for wireless signaling comprising a source of ultra-violet rays arranged to ionize the atmosphere along a long beam and electrically connecting means inserted in said ionized beam, as set forth.

7. Aerials for wireless signaling comprising a plurality of ionized beams of the atmosphere, means for ionizing said beams, and electrically connecting means inserted in said ionized beams, as set forth.

8. Aerials for wireless signaling comprising a plurality of ionized beams of the atmosphere arranged to intersect each other, means for ionizing said beams, and electrically connecting means inserted in said ionized beams, as set forth.

9. Substitute means for long conductors of electricity forming part of an electric circuit, comprising means for ionizing the atmosphere along a long beam, and means for electrically connecting said ionized beam to the electric circuit, and for facilitating the discharge of electricity in the direction of the beam facing away from the means producing the ionization, as set forth.

10. Substitute means for long conductors of electricity forming part of an electric circuit comprising a source of ultra-violet rays for ionizing the atmosphere along a long beam, means for electrically connecting said ionized beam to the electric circuit, the latter means being such as to facilitate the discharge of electricity in the direction of the beam facing away from the means producing the ionization, and means for preventing a photo-electric effect on the surface of the electrically connecting means which is facing the source of the ultra-violet rays, as set forth.

11. Aerials for wireless signaling comprising means for ionizing the atmosphere along a long beam and electrically connecting means inserted in said ionized beam, the latter means being such as to facilitate the discharge of electricity in the direction of the beam facing away from the means producing the ionization, as set forth.

12. Aerials for wireless signaling comprising means for ionizing the atmosphere along a long beam, electrically connecting means inserted in said ionized beam, the latter means being such as to facilitate the discharge of electricity in the direction of the beam facing away from the means producing the ionization, and means for preventing a photo-electric effect on the surface of the electrically connecting means which is facing the source of ultra-violet rays, as set forth.

13. Substitute means for long conductors of electricity forming part of an electric circuit, comprising means for ionizing the atmosphere along a long beam, and subdivided means for electrically connecting said ionized beam to the electric circuit, whereby the discharge of electricity into the beam is facilitated, as set forth.

14. Aerials for wireless signaling comprising means for ionizing the atmosphere along a long beam, and subdivided electrically connecting means inserted in said ionized beam, whereby the discharge of electricity is facilitated, as set forth.

15. Substitute means for long conductors of electricity forming part of an electric circuit, comprising means for ionizing the atmosphere along a long beam, means for electrically connecting said ionized beam to the electric circuit, the latter means being such as to facilitate the discharge of electricity in the direction of the beam facing away from the means producing the ionization, and means for destroying the electrical conductivity of the beam between said electrically connecting means and the ionizing means, as set forth.

16. Aerials for wireless signaling comprising means for ionizing the atmosphere along a long beam, electrically connecting means inserted in said ionizing beam, the latter means being such as to facilitate the discharge of electricity in the direction of the beam facing away from the means producing the ionization, and means for destroying the electrical conductivity of the beam between the electrically connecting means and the ionizing means, as set forth.

17. In combination an electric circuit through which the electric energy is supplied in the form of high frequency currents, means for ionizing the atmosphere along a long beam, means for electrically connecting said ionized beam to the said electric circuit, and separate means for superposing an electric field of high potential on the beam, as set forth.

18. Aerials for wireless signaling comprising means for ionizing the atmosphere along a long beam, a high frequency circuit, means for electrically connecting said high frequency circuit to the ionized beam, a second means for ionizing the atmosphere along a long beam, a second high voltage circuit, and means for electrically connecting said second high voltage circuit to the two ionized beams, as set forth.

19. Aerials for wireless signaling comprising in combination an ionized beam aerial and a metallic aerial, as set forth.

In testimony whereof I have signed my name to this specification.

JOHN HETTINGER.